United States Patent [19]
Bird

[11] 3,848,865
[45] Nov. 19, 1974

[54] CUTTING TOOL HOLDING DEVICE
[76] Inventor: Marlin E. Bird, 3417 Gabriel Ave., Zion, Ill. 60099
[22] Filed: Jan. 18, 1974
[21] Appl. No.: 434,662

[52] U.S. Cl............. 269/69, 33/174 TB, 51/218 A, 269/134, 269/244
[51] Int. Cl............................................. B23q 104
[58] Field of Search........ 33/174 TB; 51/216 ND, 33/217 A, 51/218 A; 269/69, 70, 134, 51/138, 244, 257, 268, 269, 287, 321 N

[56] References Cited
UNITED STATES PATENTS

| 693,811 | 2/1902 | Yonge | 269/69 |
| 776,553 | 6/1904 | Scoggins | 269/69 |
| 1,206,399 | 11/1916 | Bartlett | 269/244 |
| 2,157,789 | 5/1939 | Hudgens | 269/138 |
| 2,276,945 | 3/1942 | Ehrich | 269/287 |
| 2,497,943 | 2/1950 | Ingwer | 269/69 |

FOREIGN PATENTS OR APPLICATIONS

| 144,377 | 9/1903 | Germany | 269/69 |
| 200,351 | 9/1958 | Sweden | 33/174 TB |

Primary Examiner—Roy Lake
Assistant Examiner—Mark S. Bicks
Attorney, Agent, or Firm—Fitch, Even, Tabin & Luedeka

[57] ABSTRACT

A device for holding machine cutting tools, such as dovetail form or shave tools and the like, which are used in lathes or automatic screw machines is disclosed. The device is adapted to securely hold the form or shave tool in a precise position while it is being sharpened on a precision surface grinder or the like. The device may be adjusted to selectively hold the tool in one of several precisely predetermined rake angles. The device has easily adjustable tightening means for use with dovetail form and shave tools and tightly holds the tool during grinding. The device has a pin that is inserted in one of the several openings which precludes any alignment error if the pin is completely inserted in the appropriately marked opening.

7 Claims, 4 Drawing Figures

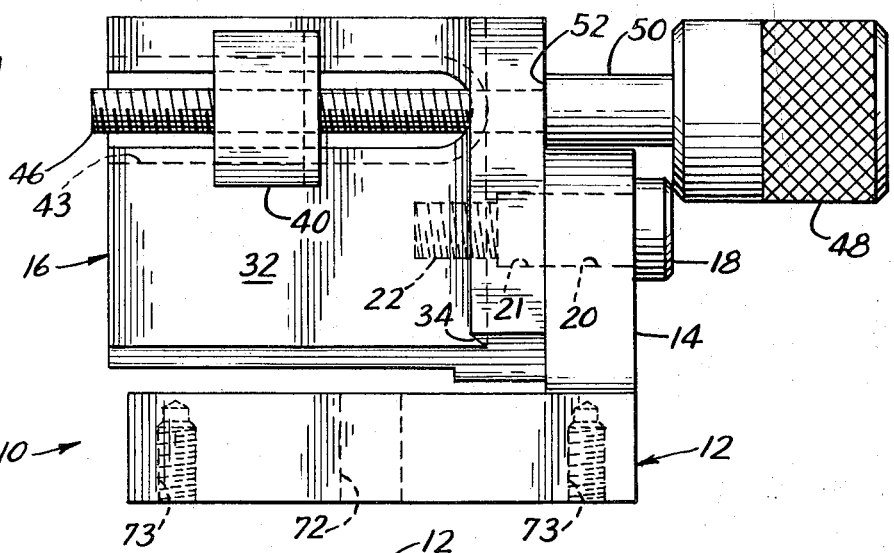
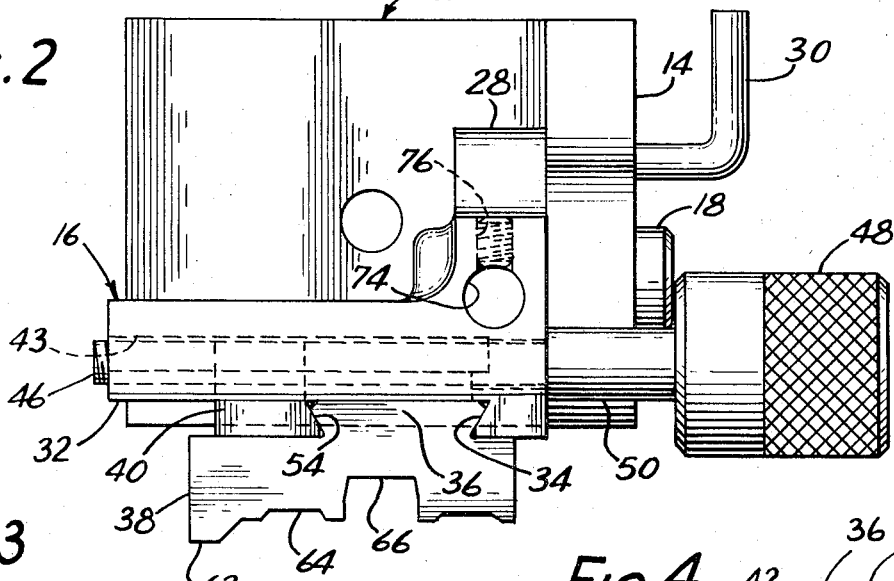
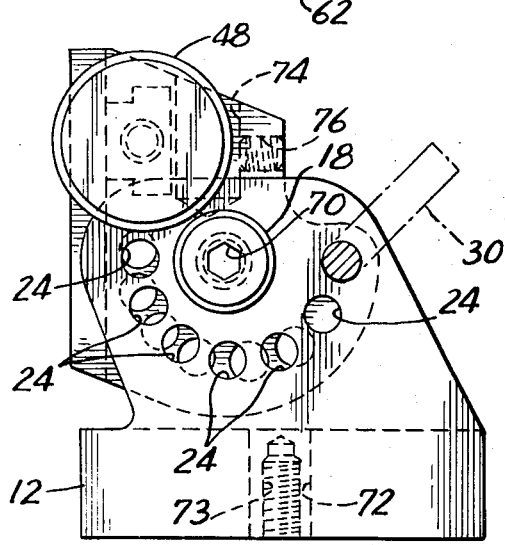
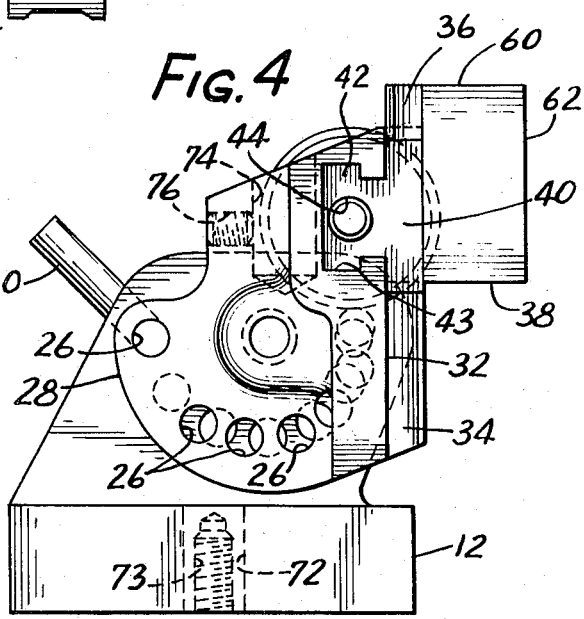

CUTTING TOOL HOLDING DEVICE

The present invention generally relates to the art of machine tools and, more particularly, to a device for holding and accurately positioning dovetail form and shave tools while grinding to sharpen the same.

The machining or cutting operations that are performed on a lathe to machine external cylindrical surfaces, as well as internal cylindrical surfaces, shoulders or ends of cylinders and the like, utilize cutting tools that are generally stationary while the workpiece is rotated by the lathe. Such cutting tools may be longitudinally or radially moved relative to the workpiece during the machining operation. Many of the surfaces that are cut using the horizontal or vertical lathe type of basic machine tool function are performed with automatic screw machines which require form or shave tools which have a dovetail configuration for being held in the machine. Such dovetail form tools must be periodically sharpened and it is the generally accepted practice to remove the tool and place it in a vice or the like, carefully measuring the angle and position to provide the proper rake angle for the tool. The tool is then placed under a surface grinder and ground until it is sharpened. While this method of sharpening has been used for some time, the extreme carefulness and accuracy required in positioning the form tool for grinding by a surface grinder or the like often takes a considerable amount of time, since it is often difficult to place and tighten the tool in a vice at the correct angle. Moreover, since the cutting faces of form tools as well as shave tools often vary considerably from one another, the difficulty in properly positioning form tools may vary and require much more time to sharpen the tool than would normally be expected.

Accordingly, it is an object of the present invention to provide an improved device for holding dovetail form and shave tools that is particularly useful in holding such tools during grinding for the purpose of sharpening the same.

It is another object of the present invention to provide such a tool holding device which easily accepts and securely holds such tools for grinding the same, and which is adjustable to provide a number of extremely accurate preselected rake angles for the cutting surfaces of the tool being ground.

Other objects and advantages of the present invention will become apparent upon reading the following detailed description in conjunction with the attached drawings, in which:

FIG. 1 is a front plan view of a tool holding device embodying the present invention;

FIG. 2 is a top plan view of the tool holding device shown in FIG. 1 and includes a representative form tool;

FIG. 3 is a right end view of the tool holding device shown in FIG. 1; and

FIG. 4 is a left end view of the tool holding device shown in FIG. 1 and includes a representative form tool.

Turning now to the drawings, and particularly FIGS. 1 and 2, a tool holding device 10 embodying the present invention and preferably made of hardened steel, is shown to include a base frame 12 having an upwardly extending transverse portion 14 to which a pivotable tool holding member 16 is attached by means of a smoothly ground bolt 18 having a smaller diameter threaded end. The bolt 18 passes through a smooth aperture 20 located within the portion 14 as well as a portion 21 located in the tool holding member 16 that is of the same size as the aperture 20. These apertures 20 and 21 are only slightly larger than the outer diameter of the bolt and provide a close fit so that the holding member 16 pivots accurately around the bolt. Moreover, the smaller diameter end portion of the bolt 18 engages a cooperatively threaded aperture 22 located in the tool holding member 16, which enables the bolt 18 to tighten the holding member 16 against the transverse portion 14 of the base frame 12 when the bolt is rotated in the proper direction.

While the tool holding member 16 is attached to the transverse portion 14 by the threaded bolt 18 and is pivotable around the bolt 18 when it has been sufficiently loosened, the device also has means for accurately positioning the angle of the tool holding member relative to the plane of the bottom of the base frame 12. Broadly stated, the positioning means comprises a number of apertures 24 located in the transverse portion 14 and a corresponding number of apertures 26 located in a transverse extention 28 of the tool holding member 16 and a pin 30 that closely fits within the apertures 24 and 26 and provides several accurate angular positions for the tool holding member, depending upon the particular aperture 24 and 26 in which the pin 30 is fully inserted.

Referring more specifically to the tool holding member 16, in addition to the previously mentioned transverse extension 28 that generally abuts the transverse portion 14 of the base frame 12, the tool holding member 16 has a substantially flat front face 32 upon which the back surface of the dovetail portion of a cutting tool, such as a shave or form tool contacts when it is held by the device. As shown in FIG. 1, the face 32 terminates in an angled abutment wall 34 located on the right side thereof. The abutment wall 34 is positioned at an angle of approximately 60° relative to the plane of the face 32 to accommodate a similarly angled dovetail portion 36 of a representative form tool 38 shown in FIGS. 2 and 4.

To hold the form tool 38 against the face 32 as well as the abutment wall 34 of the tool holding member 16, a locking element 40 is provided and has a generally T-shaped rear portion 42 as best seen in FIG. 4 that is slidable within a generally T-shaped slot 43 that is formed or cut in the holding member 16 rearwardly of the front face 32. The locking element 40 has a threaded aperture 44 within the T-shaped portion 42 that engages an elongated threaded shaft 46 having a handle means such as the enlarged knurled knob 48 and an intermediate portion 50 from which the threaded portion 46 extends. The diameter of the intermediate portion is larger than the diameter of the threaded portion and forms generally flat annular shoulder 52 that abuts the side wall of the holding member 16, due to the fact that the threaded shaft 46 extends through an aperture within the member that is slightly larger than the threaded shaft. Accordingly, the shoulder 52 bears against the side wall of the holding member 16 and rotation of the knob 48 causes the locking element 40 to be laterally moved to the left or right as shown in FIGS. 1 and 2 depending upon the direction of rotation. The locking element 40 extends outwardly beyond the front face 32 of the locking element 16 and has an angled side wall 54 that is also at an angle of approximately 60° relative to the front face 32 and cooperatively engages the opposite side of the dovetail portion 36 of the tool 38. Thus, as best shown in FIG. 2, rotation of the knob 48 will cause the slidable locking element 40 to be moved toward the right and, assuming the form tool 38 has been positioned as shown, the tool will be tightly clamped to the holding member 16 substantially parallel to the plane of the face 32. It is then only necessary to properly orient the plane of the face 32 relative to the base frame 12 to accurately position the tool being held for grinding on a precision surface grinder or the like.

It should be understood that a form or shave tool 38 similar to that shown in FIG. 2 and 4 has a cutting edge defined by the intersection of the top wall 60 and the contoured front face 62 which may have recesses such as those shown at 64 and 66. When the form tool 38 is mounted for use in an automatic screw machine or the like, it must be correctly positioned in terms of its rake angle, i.e., the angle between the top surface and a plane which is perpendicular to the surface of the work and to the direction of motion of the tool with respect to the work, or the work piece will not have the desired dimensional accuracy when it is completed. Moreover, when the tool becomes dull and requires sharpening, it is important that the original preselected rake angle of the tool be maintained during sharpening, or the dimensions of the workpiece will be changed. This can be understood from viewing the front face 62 of the form tool 38 shown in FIG. 2 and realizing that each of the surfaces 64 and 66 cut cylindrical surfaces of different diameters. If the rake angle is increased those portions of the resulting workpiece that are of a larger diameter would be oversized. For this reason, sharpening of the form tool must be done with extreme accuracy by grinding the surface 60 uniformly so that the original rake angle is maintained.

Form tools are typically designed with rake angles of a certain amount, such as 0°, 5°, 10°, 12°, 15°, 17° or 20°. Accordingly, the device embodying the present invention has the aforementioned apertures 24 and 26 of the base frame and holding member positioned with respect to one another so that the pin 30 can only be inserted into an aperture in both members when the holding member is properly aligned or positioned. The apertures within the transverse portion 14 are preferably numbered so that the pin can be inserted into the appropriate aperture 24 as desired and the holding element 16 can thereafter be pivoted around the bolt 18 until the pin can be completely inserted into the proper aperture 26 of the holding member 16. There is a one-to-one relationship between the sets of apertures 24 and 26 so that at any angle within the range of 0° to 20° of rake which is marked in the increments previously mentioned, only one aperture 24 and one aperture 26 is capable of receiving the pin 30 and it is therefore impossible to provide a rake angle that is incorrect, assuming the pin 30 is initially inserted in the correct aperture 24. This is shown in the drawings by the increasing radii or distance between the pivot bolt 18 and the apertures 24 (see FIG. 3), as well as between the pivot bolt 18 and the apertures 26 (FIG. 4). Thus, only individual pairs or sets of apertures 24, 26 will be on the same radius from the bolt 18 and will accept the pin 30, if the angular position is such that they are aligned. Accordingly, insertion of the pin 30 into one of the apertures 24 will require angular manipulation until it can be inserted into its cooperative aperture 26 and the insertion into the aperture 26 is indicative that the holding member front face is at the precise angular position, which is preferably marked adjacent the aperture 24, although such markings are not shown in FIG. 3.

To sharpen a form tool such as the tool 38, it is clamped into the holding member 16 by rotating the knob 48 as previously described and the pin 30 is inserted within the appropriate hole 24 corresponding to the number of degrees of rake that are desired and the bolt 18 which preferably has a hexagonal recess 70 therein for receiving a hexagonal key wrench or the like so that the bolt may be securely tightened to insure that no movement occurs between the base frame 12 and the holding member 16. Thereafter, the device 10 is preferably placed on an automatic surface grinder and sharpened by moving the holder with the form tool therein beneath the grinding wheel. The base frame 12 is sufficiently thick to enable the device to be held by a magnetic vice, if desired. Alternatively, an aperture 72 may be provided within the base frame for bolting the device to a table of a surface grinder or the like.

The base frame preferably has one or more threaded apertures 73 therein for receiving bolts for securing a shim that may be required to provide a slight side rake angle (1° or 2°, for example), in the event the form tool was originally made with a left or right side rake angle.

In accordance with another aspect of the present invention, the holding member 16 has a generally vertically oriented aperture 74 to which a smaller threaded aperture 76 intersects so that a set screw may be used to hold a tool placed in the aperture 74. The aperture 74 is intended to receive a diamond tipped sharpening tool or dresser that will true the grinding wheel of the surface grinder so that it will accurately sharpen the form tool. After the grinding wheel has been trued or dressed, the diamond tipped sharpening tool may be removed and the elevation of the grinding wheel adjusted to the desired level for sharpening the form tool 38. In this connection, the elevations of both the diamond dresser and the form tool are generally the same, which eliminates the inconvenience of drastically changing the elevation of the grinding wheel to sharpen the form tool after dressing the wheel. It should be understood that as the form tool is worn and repeatedly sharpened, the surface 60 will gradually be ground down so that the height of the tool as shown in FIG. 4 will be appreciably reduced. For this reason the slot 43 is positioned as near the top of the member 16 as possible to enable effective sharpening of smaller height tools.

From the foregoing detailed description, it should be understood that a device for holding form tools and the like has been described which is of a compact size and permits easy set up for use with surface grinders or the like. The device is sufficiently adjustable that it will accept a large range of dovetail type form or shave tools and will accurately position the tool in terms of the desired rake angle. Moreover, the ease in which the angle of rack can be adjusted and precisely positioned permits efficient and accurate sharpening of such tools.

Although various embodiments of the invention have been shown and described, they will suggest a number of variations and modifications to persons skilled in the art. Accordingly, the scope of the protection to be afforded this invention should not be limited by the particular embodiments shown and described, but should be determined in terms of the definitions set forth in the appended claims, and equivalents thereof.

Various features of the invention are set forth in the following claims.

I claim:

1. A device for holding cutting tools such as form tools and the like, while sharpening the same, the device comprising:

a base frame having a generally flat base portion and a generally transverse portion extending outwardly from said base portion;

a holding member having a generally flat front face and an acutely angled abutment wall extending along one side of said front face, said wall being adapted to receive one side of a dovetail portion of the cutting tool, said holding member having a transverse extension for contacting the transverse portion of said base frame;

means for pivotably connecting said transverse extension to said transverse portion to enable said front face to be angularly adjusted relative to said base frame;

means for releasably locking said front face of said holding member in one of several predetermined angular positions, said locking means comprising a cooperative set of apertures in each of said base frame transverse portion and said holding member transverse extension and pin means adapted to be inserted therein, each of said sets being on a different radius from the pivotable connection so as to prohibit said pin means from being inserted into more than one aperture of said holding member transverse extension, once said pin means has been inserted into an aperture in said base frame transverse portion; and, means associated with said holding member for engaging the opposite side of said dovetail portion of the cutting tool and urging said dovetail portion toward said abutment wall to securely hold the tool in the device.

2. A device as defined in claim 1 wherein said engaging means on said holding member comprises a holding element having a threaded aperture therein, said holding member having a recessed slot in which said element is slidable, and an elongated threaded shaft having handle means at one end thereof, so that rotation of said handle means rotates said threaded shaft and moves said slidable element along said slot, said element having an acutely angled side wall extending forwardly of said front face generally oppositely of said acutely angled abutment wall.

3. A device as defined in claim 1 wherein said holding member includes an upwardly directed aperture positioned substantially parallel to the plane of the front face, said holding member also including a smaller threaded aperture intersecting said aperture positioned parallel to the front face, said smaller aperture being adapted to receive a set screw or the like.

4. A device as defined in claim 1 wherein the angle of said holding member abutment wall relative to said front face is less than about 60°, so that as said engaging means on said holding member moves said dovetail portion towards said abutment wall, said dovetail portion is firmly urged against said flat front face and thereby insures that said cutting tool is positioned parallel to said face.

5. A device as defined in claim 2 wherein the angle of said side wall of said slidable element is less than about 60°.

6. A device as defined in claim 1 wherein said pivotable connection comprises a threaded bolt inserted through an enlarged aperture in said base frame transverse portion into a threaded aperture in said holding member transverse extension, so that rotation of said bolt in a predetermined direction tightens said holding member transverse extension against said base frame transverse portion.

7. A device as defined in claim 1 wherein the lower surface of said base frame includes at least two threaded apertures for attaching a side rake angle shim member or the like.

* * * * *